April 17, 1951 L. F. REINHOLD 2,549,009

CODE DISK ASSEMBLY AND BALL BEARING THEREFOR

Filed Aug. 13, 1946

INVENTOR
Leonhard F. Reinhold
BY Darcy G. Stover
ATTORNEY

Patented Apr. 17, 1951

2,549,009

UNITED STATES PATENT OFFICE 2,549,009

CODE DISK ASSEMBLY AND BALL BEARING THEREFOR

Leonhard Florens Reinhold, Great Kills, N. Y., assignor to Radio Corporation of America, a corporation of Delaware Application August 13, 1946, Serial No. 690,210

4 Claims. (Cl. 308—22)

Figure 1:
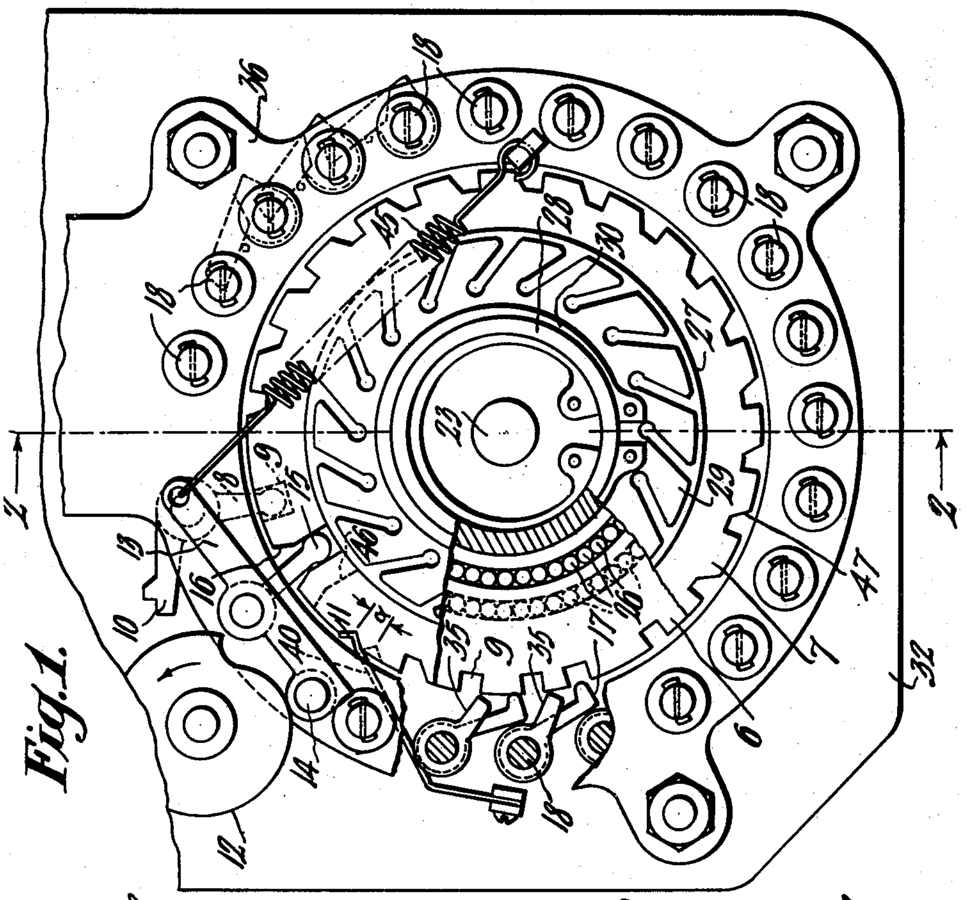

This invention relates to mountings for code discs, such as used in printing telegraph apparatus and the like. The principal object of the invention is to provide a practical form of assembly of the code discs with ball bearings so arranged as to facilitate independent rotation of each individual disc.

In carrying out my invention, it is essential that the discs be mounted in planes parallel to one another, and that the ball bearings be held in place with a minimum amount of end play and with a minimum degree of friction. I, therefore, provide resilient means for applying a suitable amount of compression for taking up the end play in the disc assembly.

My invention is somewhat closely related to that which was set forth in my Patent No. 2,375,829 which was issued on May 15, 1945. In that patent, however, I disclosed a system of code rings having internally disposed notches for the purpose of setting these rings in different permutational arrangements, whereby an index arm, carrying a type-wheel, for example, could be arrested in a selected position for printing any desired character.

The instant application deals with a ball bearing assembly for code discs which may be used for purposes similar to those of the code rings in the aforementioned patent. In this case, however, the code discs are externally notched and they are supported on a hub member which is concentric with the shaft of the type-wheel and the index arm.

In a preferred type of printing telegraph apparatus in connection with which my invention finds utility, the selecting mechanism includes externally-notched code discs coaxially disposed with respect to a type-wheel shaft and its index arm. Overriding the notches of the code discs, different selecting members or stops are disposed, each of these selecting members being pivotally mounted between two frame plates and arranged to drop into any alignment of notches in the code discs which may be developed by different permutational settings of the discs. When one of these selecting members drops into such an alignment of notches, it interposes a stop member into the path of the index arm. Consequently, upon rotation of the index shaft and type-wheel, a point is reached where the index arm is confronted by the selecting stop member and is arrested for the purpose of printing a character.

From the foregoing description, it will be apparent that the following objects are among those principally sought in carrying out my invention:

1. To provide a practical form of ball bearing assembly which facilitates independent orientation of a plurality of code discs.

2. To obtain equalized frictional adjustment with respect to the code disc members in a ball-bearing assembly, thereby to compensate for wear and for slight variation in the thickness of the respective code discs.

3. To obtain freedom of individual rotative movement of a set of juxtaposed disc members by the use of ball bearings which are caged in alternate ones of said disc members, intervening disc members acting as flat bearing surfaces.

Figure 2:
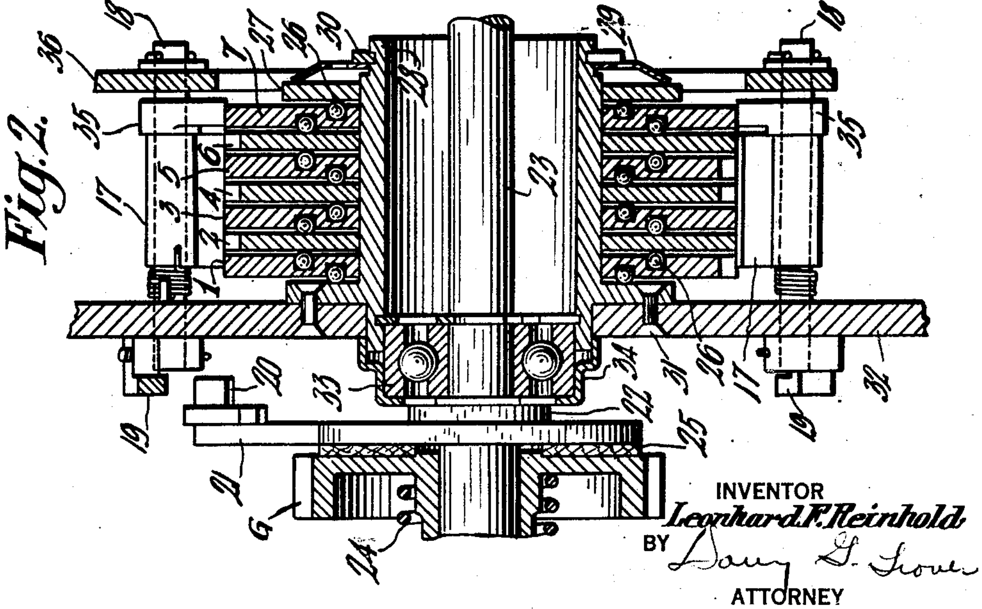

The above and other objects of my invention, as well as its advantages, will be made apparent in the description to follow. This description is accompanied by a drawing, in which:

Fig. 1 shows a front view of a portion of the selecting mechanism to which my invention is related, and Fig. 2 shows a cross-section of the code disc assembly taken along the line 2—2 in Fig. 1.

The selecting mechanism with which my assembly of code discs is operatively combined is one which constitutes subject matter for another invention. The details of the selecting mechanism per se need not be fully described in this application since it is only necessary to understand that my code discs 1 to 6 inclusive are arranged to be moved through a slight angle *a* by means of rotatable fingers 8, each of which is set into a notch 9 in a particular disc. The setting operation results from the release of different bell crank members 10, which are spring-actuated and which cause the code discs to rotate clockwise through said angle *a*. In one embodiment of the invention this angle was 5°.

The discs 1 to 6 inclusive are held in either of their two positions of setting by means of detent springs 40 which engage with one or the other of two notches at position 11. In practice, different code combinations are set up in response to the reception of telegraph code signals working through selecting magnets (not shown). It is this selecting process which results in the permutational actuation of the bell-crank members 10.

After a selecting operation has been performed, it is necessary to restore the code discs to their normal positions. This is accomplished by means of a rotatable cam 12 which rotates through a single cycle after the printing of each character. The cam 12 rotates in such a manner as to actuate a lever 13, at one end of which is mounted a cam follower roller 14. This roller is pressed against the periphery of the cam by means of a spring 45. A vane 15 is fixed onto the hub of lever 13 and extends through a narrow notch 16 in disc 7 and through wider notches 46 in the code discs. A slight rocking motion of the lever 13 when the roller 14 drops into a depression in the cam 12 causes the code discs to be restored to their initial positions in a counter-clockwise direction. Disc 7 has a reciprocating motion, subject to that of the vane 15, and performs a function presently to be explained.

The selecting notches 9 in each code disc are differently spaced apart around the periphery of these discs, in order that upon setting selected ones of the discs in different combinations an alignment of such notches will be created in correspondingly different positions. The selection thus made causes the type-wheel to be arrested at the desired character printing position. Each of the selecting vanes 17 extends across the entire assembly of code discs. Each vane 17 is integral with a shaft 18, and each shaft is pivotally held in place by bearing holes in the frame plates 32 and 36. In practice three or four of the discs are moved into a selecting position while the remaining discs are held in their normal positions. Each combination of moved and unmoved code discs produces an alignment of notches corresponding to the code elements of a signal, and the notch alignment is what determines the position of arrest of the type-wheel. One of the vanes 17 drops into such an alignment and rotates a stop finger 19 into the path of the index arm extension 20. The index arm 21 is mounted on a hub-member 22 so as to rotate with the type-wheel shaft 23.

The purpose of the restoring disc 7 is to disengage the selected vane 17 from the alignment of notches into which it becomes seated upon making a selection. The vane 17 is withdrawn from such notches by counter-clockwise rotation of the restoring disc 7, into one of the notches 47 of which a toepiece 35 was previously seated.

When the disc oscillates from and to its normal position, driven by the finger 15 in response to the cyclic action of cam 12, then the vane 17 which was engaged in an alignment of notches is lifted out therefrom, since the toepiece 35 is driven out of notch 47 along the inclined edge thereof. With this operation, the entire assembly of code discs and restoring disc, as well as the operated selector vane 17 are brought back to their normal positions, ready for a subsequent character selecting operation to be performed.

Rotation of the type-wheel shaft 23 is caused by a motor-drive through gearing and a friction clutch 25. One of the gear members G is shown in Fig. 2, this member being pressed against the face-plate portion of an index arm 21 by means of a spring 24. Between the side-wall of the gear member G and the disc portion of the index arm 21, I interpose a disc 25 made of compressible material which constitutes a suitable buffer for friction clutch requirements.

Upon reference to Fig. 2, it will be observed that code discs 1, 3 and 5, as well as a restoring disc 7 are formed with a ball race on both sides thereof. The intervening code discs 2, 4 and 6 have substantially flat sides which act as thrust bearing surfaces for the balls 26. Each race is substantially filled with balls. In each of the discs having ball races, it will be noted that one race is of smaller diameter than the other in order that the overall thickness of the disc may be minimized and that sufficient material be had to avoid weakening the structure at the bottom of each ball race.

The balls 26 on the outer side of the disc 7 bear against a washer 27 which is loosely mounted on the hub member 28. Against the washer 27 is pressed a resilient disc 29, the rim of which is formed with slits so as to obtain a plurality of independent bearing surfaces for equally distributing the pressure around the circumference of the disc 27. The compression washer 29 is held in place by means of a retaining ring 30, this ring being assembled with the hub 28 by opening it up and then allowing it to drop into and be held by a channel around the hub.

The hub member 28 is fixedly supported by means of rivets 31 extending through a flange of the hub member and through the mounting plate 32.

Within the hub member 28 is mounted a ball bearing assembly 33 which includes both inner and outer bearing members and balls all arranged to provide suitable journal bearings for the index shaft 23. This ball bearing assembly is held in place by means of a cap member 34 which fits tightly on the end of the hub 28.

It will be clearly understood by those skilled in the art that modifications of my invention may be made without departing from its spirit and scope. Such modifications will, doubtless, be suggested in view of the foregoing description and for the purpose of adapting the invention to various forms of selecting mechanism with which it is to be combined.

I claim:

1. A ball-bearing assembly for holding a plurality of discs in parallel planes free to assume independent positions of orientation, said assembly comprising said discs, alternate ones of which are channeled with circular ball races on opposite sides thereof and the intervening discs are flat on both sides thereof, a set of balls substantially filling each race, and resilient means for exerting pressure between the outermost discs of the assembly and intervening discs.

2. A ball bearing assembly according to claim 1 wherein the ball races of the channeled discs are of different diameters on opposite sides of the same disc.

3. In a selecting mechanism, an assembly of code discs coaxially mounted for independent setting in either of two positions of orientation, a reset disc coaxially assembled with said code discs, balls substantially filling circular ball races which are formed in certain of said code discs and in said reset disc, intervening ones of said discs being substantially flat, a hub member on which said discs are axially mounted, said hub member having a flange position which functions as a thrust bearing for the balls in one of the races, and resilient means mounted on the other end of said hub for exerting pressure between said discs.

4. A ball-bearing assembly comprising a plurality of flat discs disposed in parallel planes and freely rotatable through a relatively small angle about a common axis, each under independent control of an associated driving means, alternate ones of said discs being channeled with circular ball races on opposite sides thereof, and the remaining discs being flat on both sides and of lesser overall thickness than said channeled discs, a set of balls substantially filling each race, a hub having a flange portion which offers a bearing surface to the balls in one of the two outermost races, a washer member offering a bearing surface to the balls in the other of the two outermost races, a compression washer held in place on said hub, and a retaining ring fitted into a channel around said hub and suitably disposed for holding said washer under tension, thereby to cause the several members of the ball bearing assembly to be mutually compressed.

LEONHARD FLORENS REINHOLD.

REFERENCES CITED

The following references are of record in the file of this patent:

UNITED STATES PATENTS

| Number | Name | Date |
|---|---|---|
| 740,682 | Myers | Oct. 6, 1903 |
| 1,821,124 | Swan | Sept. 1, 1931 |
| 2,326,298 | Hewitt | Aug. 10, 1943 |
| 2,340,804 | Fitch et al. | Feb. 1, 1944 |
| 2,375,829 | Reinhold | May 15, 1945 |
| 2,406,044 | Spencer et al. | Aug. 20, 1946 |